(12) United States Patent
Tsuji et al.

(10) Patent No.: US 7,202,777 B2
(45) Date of Patent: Apr. 10, 2007

(54) TIRE CONDITION MONITORING SYSTEM

(75) Inventors: Hiroyuki Tsuji, Anjo (JP); Koji Murayama, Kariya (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 95 days.

(21) Appl. No.: 11/012,104

(22) Filed: Dec. 16, 2004

(65) Prior Publication Data
US 2005/0151634 A1 Jul. 14, 2005

(30) Foreign Application Priority Data
Jan. 9, 2004 (JP) ............................. 2004-004366
Jan. 19, 2004 (JP) ............................. 2004-011170

(51) Int. Cl.
*B60C 23/00* (2006.01)
(52) U.S. Cl. .................... 340/445; 340/447; 340/539.1; 340/539.24; 73/146; 116/34 A; 152/152.1
(58) Field of Classification Search ........ 340/445–448, 340/539.1, 539.24; 73/146; 116/34 A, 34 B, 116/34 R; 152/152.1
See application file for complete search history.

(56) References Cited

U.S. PATENT DOCUMENTS

| | | | |
|---|---|---|---|
| 4,067,235 A * | 1/1978 | Markland et al. .......... | 73/146.5 |
| 5,541,574 A * | 7/1996 | Lowe et al. ............... | 340/447 |
| 6,087,930 A | 7/2000 | Kulka et al. | |
| 6,545,599 B2 | 4/2003 | Derbyshire et al. | |
| 6,838,985 B2 * | 1/2005 | Ghabra et al. ............. | 340/445 |
| 6,911,904 B2 * | 6/2005 | Nantz et al. ............... | 340/448 |
| 2003/0184944 A1 | 10/2003 | Hattori | |
| 2004/0036591 A1 * | 2/2004 | Desai et al. ............... | 340/445 |

FOREIGN PATENT DOCUMENTS

| JP | A-H08-244423 | 9/1996 |
|---|---|---|
| JP | A-2001-250186 | 9/2001 |

OTHER PUBLICATIONS

First Office Action from Chinese Patent Office issued on Sep. 29, 2006 for the corresponding Chinese patent application No. 200510003811.8 (a copy and English translation thereof).

* cited by examiner

*Primary Examiner*—Jeffery Hofsass
*Assistant Examiner*—Hongmin Fan
(74) *Attorney, Agent, or Firm*—Posz Law Group, PLC

(57) ABSTRACT

A tire condition monitoring system is composed of a detector installed in each tire, a transmitter positioned in the vicinity of each tire, and a monitor communicating with the transmitters and the detectors. An initiation signal for initiating operation of the detector is wirelessly sent from the transmitter to the detector, using a low frequency, and the pressure and temperature data detected by the detector are wirelessly sent to the monitor, using a radio frequency. A vehicle identification code differentiating the vehicle from other vehicles may be included in the initiation signal to avoid confusion with signals wirelessly sent from other vehicles. The detector is operated only when the tire condition data from that detector are required to minimize power consumption in the detector.

15 Claims, 11 Drawing Sheets

| TIRE POSITION | DETECTOR ID |
|---|---|
| FRONT LEFT (FL) | A |
| FRONT RIGHT (FR) | B |
| REAR LEFT (RL) | C |
| REAR RIGHT (RR) | D |
| SPARE TIRE | E |

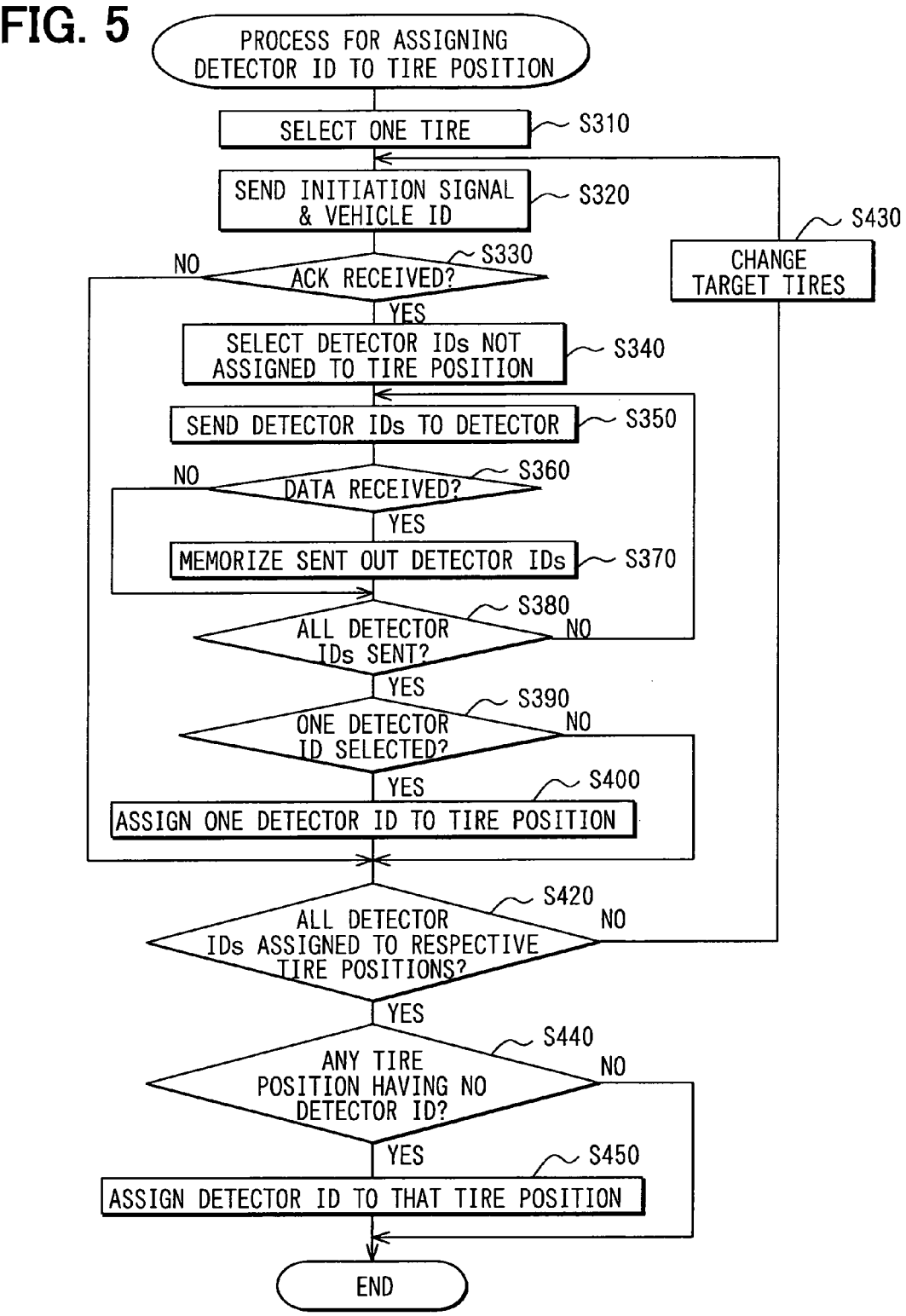

TIRE CONDITION MONITORING SYSTEM

CROSS-REFERENCE TO RELATED APPLICATIONS

This application is based upon and claims benefit of priority of Japanese Patent Applications No. 2004-4366 filed on Jan. 9, 2004 and No. 2004-11170 filed on Jan. 19, 2004, the contents of which are incorporated herein by reference.

BACKGROUND OF THE INVENTION

1. Field of the Invention

The present invention relates to a tire condition monitoring system for use in an automotive vehicle, the system wirelessly detecting tire conditions including pressure and temperature in a tire.

2. Description of Related Art

A tire condition monitoring system, in which tire conditions such as pressure and temperature in each tire are detected and the data are wirelessly transmitted to an on-board monitor, has been known hitherto. The detected data transmitted to the monitor are informed to a driver of the vehicle to enhance driving safety. Generally, in this kind of monitoring system, a detector installed in each tire is automatically and periodically activated even when detected data are not required. Therefore, energy consumption in the detectors become high, and a battery having a high capacity has to be installed to each detector. In addition, the detected data may be simultaneously transmitted from plural detectors to the monitor, causing confusion among the data.

To cope with those problems, an improved system is proposed by JP-A-8-244423. In this system, an identification code is assigned to a detector installed in each tire, and a particular detector selectively activated. In this manner, power consumption in the detector can be lowered, and simultaneous data transmission from plural detectors is avoided. Another proposal has been made in JP-A-2001-250186. In this proposed system, a signal for initiating operation of the detectors is sent when an engine is started, and the operation of the detector is terminated when the engine is stopped.

In those proposed systems, however, the following problems are involved. When other vehicles having a monitoring system similar to his own system come close to his own vehicle, detectors of other vehicles may be actuated simultaneously with his own detectors based on the initiation signal wirelessly transmitted from a transmitter of his own vehicle or other vehicles. If this happens, data detected by detectors of other vehicles, which are wirelessly transmitted, may be received by the monitor of his own vehicle, causing confusion with the data detected by the detector of his own vehicle. This trouble may be caused by the detector signals from other vehicles when his monitor does not send the initiation signal to his detector. Further, though it is conventionally proposed to decrease the power consumption in the detectors by operating the detectors for a limited time period, the amount of power saved in that method is not sufficiently large.

SUMMARY OF THE INVENTION

The present invention has been made in view of the above-mentioned problems, and an object of the present invention is to provide an improved tire condition monitoring system, in which data wirelessly transmitted from other vehicles do not cause confusion with data detected by a monitoring system of his own vehicle. Another object of the present invention is to provide a tire condition monitoring system, in which power consumption in detectors is minimized.

The tire condition monitoring system according to the present invention is composed of a detector installed in each tire, a transmitter positioned in the vicinity of each tire, and a monitor mounted on a vehicle. The detector includes a pressure sensor and a temperature sensor for detecting conditions in the tire. The detected data by the detector are wirelessly transmitted from the detector to the monitor using a radio frequency (e.g., 315 MHz). Operation of the detector is initiated by an initiation signal wirelessly transmitted from the transmitter corresponding to that detector using a low frequency (e.g., 135 kHz). The initiation signal is sent to the transmitter from the monitor when detection of the tire conditions is required.

A vehicle identification code differentiating his own vehicle from other vehicles may be included in the initiation signal, and only when the vehicle identification code coincides with the vehicle identification code pre-memorized in the detector, the detected data are transmitted from the detector to the monitor. In this manner, confusion of the detected data with signals wirelessly transmitted from other vehicles is avoided. Power to operate the detector is obtained by rectifying the low frequency wave transmitted from the transmitter. Accordingly, it is not necessary to install a battery in the detector.

Further, a detector identification code may be assigned to the detector installed in each tire taking respective positions, and the detector identification code may be included in the initiation signal. The detector is adapted to transmit the detected data only when both of the vehicle identification code and the detector identification code coincide with those codes pre-memorized in the detector. In this manner, data confusion among detectors are surely avoided. It is further effective to includes a device for automatically re-assigning the detector identification codes after the tire positions are changed by tire-rotation. The initiation signal may be sequentially supplied to the detectors to thereby sequentially receive the detected data to avoid any data confusion. The initiation signal may be re-sent to the detector which has not sent the detected data to further ensure data collection at the monitor.

It is desirable to operate only a target detector from which tire condition data are required and to terminate its operation after the detected data are obtained. For this purpose, the initiation signal is supplied only to the target detector and only when the data from the target detector is necessary. In this manner, power consumption in the detector is minimized.

It is possible to eliminate communication in the radio frequency signals in the system and to use communication only in the low frequency signals. In this case, antennas capable of receiving and transmitting the low frequency signals are provided in both of the transmitter and the detector. The initiation signal is sent from the transmitter to the detector using the low frequency signals, and the detected data representing the pressure and temperature in the tire are sent from the detector to the transmitter using the low frequency signals.

Other objects and features of the present invention will become more readily apparent from a better understanding of the preferred embodiments described below with reference to the following drawings.

BRIEF DESCRIPTION OF THE DRAWINGS

FIG. 5 is a flowchart showing a process for assigning detector identification codes to tires located at respective positions;

DETAILED DESCRIPTION OF THE PREFERRED EMBODIMENTS

Figure 1:
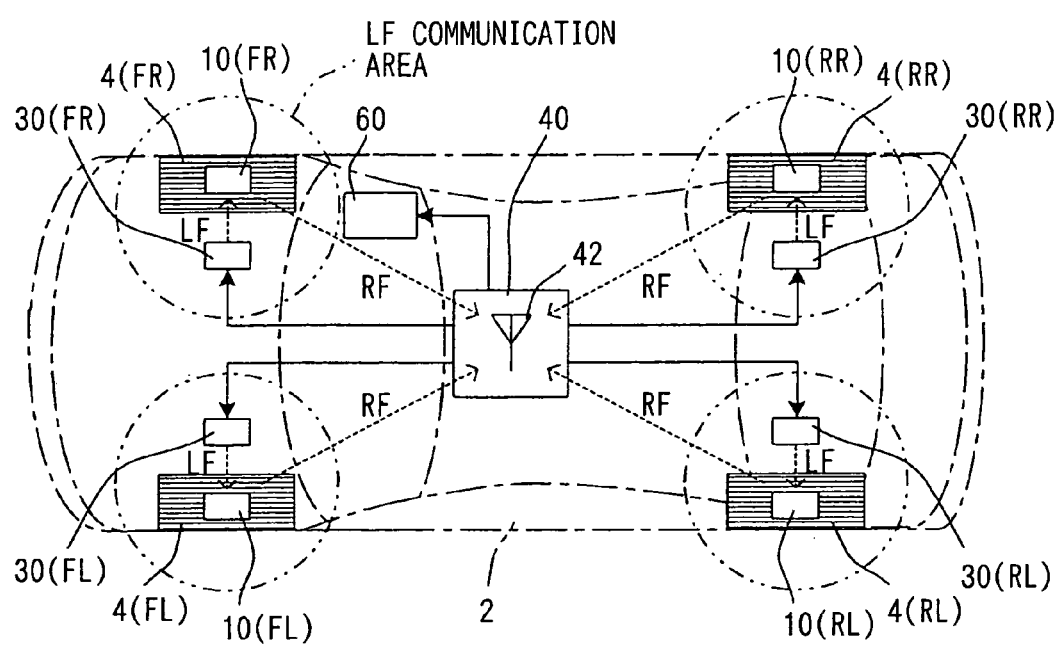
FIG. 1 is a block diagram showing a vehicle on which a tire condition monitoring system is mounted.

A first embodiment of the present invention will be described with reference to FIGS. 1–5. As shown in FIG. 1, a tire condition monitoring system according to the present invention is composed of: a detector 10 installed in each tire 4 of an automotive vehicle 2; a transmitter 30 positioned in the vicinity of each tire 4; a monitor 40 mounted on the vehicle; and an informing device 60. The tire 4 includes a front left tire 4 (FL), a front right tire 4 (FR), a rear left tire 4 (RL) and a rear right tire 4 (RR). The detector 10 includes a front left detector 10 (FL), a front right detector 10 (FR), a rear left detector 10 (RL) and a rear right detector (RR). The transmitter 30 includes a front left transmitter 30 (FL), a front right transmitter 30 (FR), a rear left transmitter 30 (RL) and a rear right transmitter 30 (RR). Since all of the detectors 10 are identical, each of the detectors 10 will be simply referred to as a detector 10. Similarly, since all of the transmitters 30 are identical, each of the transmitters 30 will be simply referred to as a transmitter 30.

The tire 4 is a tubeless-type and is filled with pressurized air. Pressure and temperature in the tire 4 are detected by the detector 10 installed therein, and data representing the detected pressure and temperature (referred to as detected data) are wirelessly transmitted to the monitor 40, using a radio frequency (RF) in an ultra high frequency band (UHF) or in a very high frequency band (VHF). For example, 315 MHz is used as the radio frequency (FR). The transmitter 30 is positioned in the vicinity of each tire 4 so that signal transmitted from the transmitter 30 reaches only the detector 10 installed in that tire 4. A signal for initiating the detecting operation of the detector 10 (referred to as an initiation signal) is transmitted from the transmitter 30 to the detector 10, using a low frequency (LF) in a long wave band, e.g., 135 kHz.

The power of the LF signal transmitted from the transmitter 30 to the detector 10 is so set that the LF signal reaches only the detector 10 positioned in the vicinity of the transmitter 30. An LF signal communication area is shown in FIG. 1 with a dotted circle. The power of the RF signal transmitted from the detector 10 to the monitor 40 is set to a level so that the RF signal is able to reach the monitor 40. The initiation signal for initiating operation of the detector 10 is sent to the transmitter 30 from the monitor 40, and then the initiation signal is wirelessly transmitted to the detector 10 using the LF signal. The detected data signal is wirelessly transmitted from the detector 10, using the RF signal, to the monitor 40. The RF signal is received by an antenna 42 (refer to FIG. 2) of the monitor 40.

The RF signal received by the monitor 40 is demodulated to obtain the detected data, i.e., the pressure and the temperature in the tire 4. The informing device 60, including a buzzer, a speaker and a display panel, is connected to the monitor 40. When the detected tire pressure and the temperature are normal, they are displayed on the display panel. When any abnormality is found, an alarm is given to a driver, and which tire is in trouble is shown on the display panel or informed to the driver from the speaker.

Figure 2:
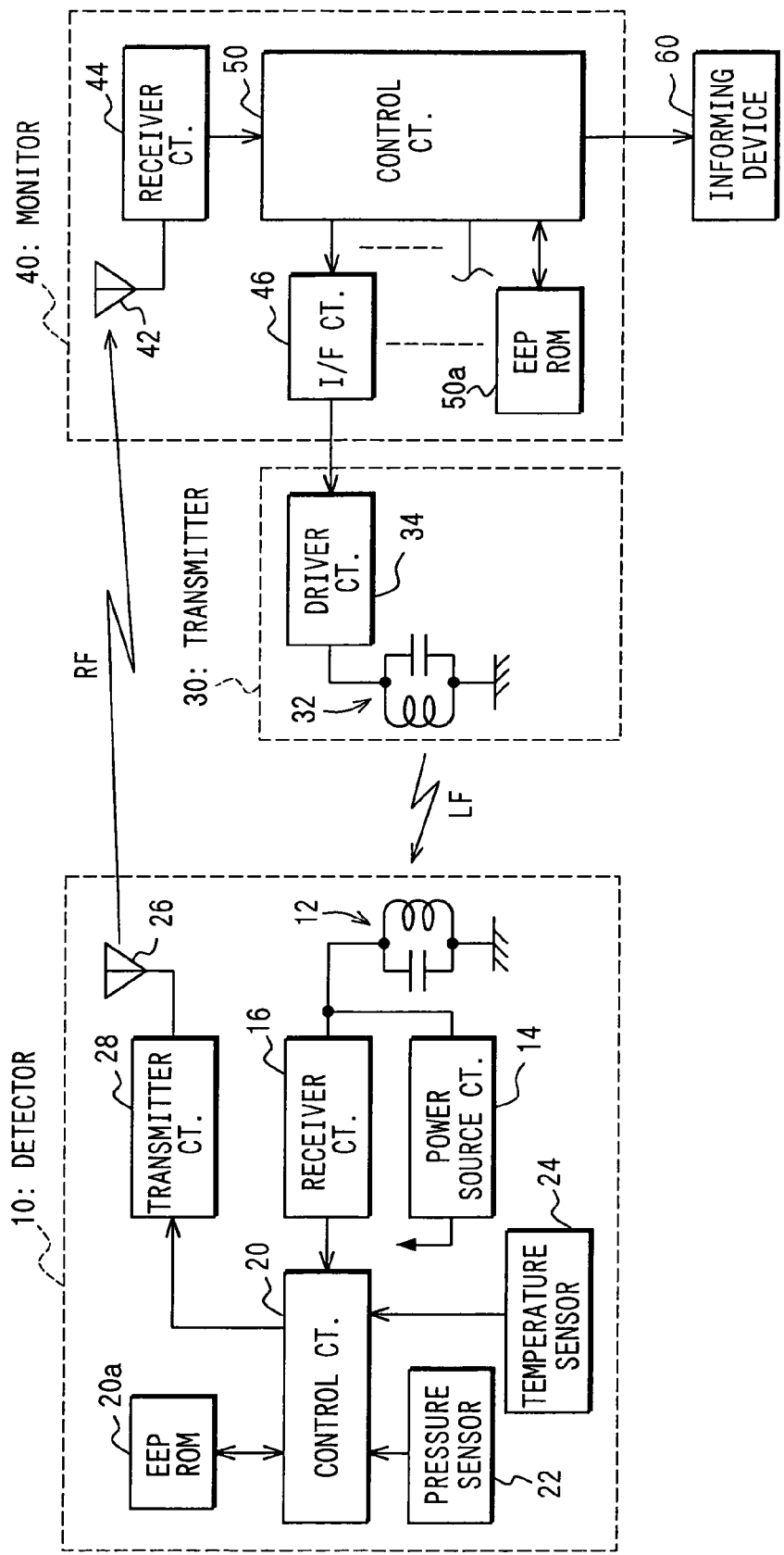
FIG. 2 is a block diagram showing a structure of a tire condition monitoring system as a first embodiment of the present invention.

As shown in FIG. 2, the tire condition monitoring system is composed of the detector 10, the transmitter 30, the monitor 40 and the informing device 60. The detector 10 includes: an antenna 12 for receiving the LF signal transmitted from the transmitter 30; a power source circuit 14 for generating a direct current voltage at a constant level by rectifying the LF signal and storing the rectified voltage in a capacitor; a receiver circuit 16 for demodulating the LF signal to obtain information included in the LF signal; a pressure sensor 22 for detecting pressure in the tire 4; a temperature sensor 24 for detecting temperature in the tire 4; a transmitter circuit 28 for transmitting the detected data (tire pressure and tire temperature) from an antenna 26 using the RF signal; and a control circuit 20 that determines whether the information fed from the receiver circuit 16 indicates to operate the sensors 22, 24 and feeds the detected data to the transmitter circuit 28.

The control circuit 20 is composed of a microcomputer including CPU, ROM, RAM and other components. The control circuit 20 also includes a non-volatile memory (EEPROM 20a) in which the following codes are memorized: an vehicle identification code (vehicle ID) that identifies his own vehicle (differentiating his vehicle from other vehicles) and detector identification code (detector ID) that identifies the detector 10 installed in the tire taking a particular position (differentiating one detector from other detectors). The control circuit 20 determines whether the initiation signal is directed to the particular detector 10 based on the ID codes memorized in the EEPROM 20a.

The transmitter circuit 28 wirelessly transmit the RF signal from the antenna 26 to the monitor 40. The transmitter circuit 28 is composed of a local oscillator for generating a carrier wave having a frequency in a UHF band (or VHF band) and a modulator for modulating the carrier wave with the detected data fed from the control circuit 20. The antenna 26 transmits the RF signal in the UHF band (e.g., 315 MHz) to a receiving antenna 42 of the monitor 40. The antenna 12 is a resonant antenna composed of a coil and a capacitor. The initiation signal (LF signal in a long wave band, e.g., 135 kHz) transmitted from the transmitter 30 is received by the antenna 12.

Circuit components in the detector 10, including the receiver circuit 16, the control circuit 20 and the transmitter circuit 28, are all powered by the direct current power source generated in the power source circuit 14 by rectifying the LF wave received by the antenna 12. Accordingly, no battery is installed in the detector 10. On the other hand, the transmitter 30 and the monitor 40 are powered by an on-board battery mounted on the vehicle.

The transmitter 30 is composed of a transmitting antenna 32 (a resonant antenna composed of a coil and a capacitor) and a driver circuit 34 for driving the transmitting antenna 32 according to signals sent from the monitor 40. The monitor 40 is composed of plural interface circuits 46 (I/F circuits) each sending to each transmitter 30 signals including the initiation signal, a control circuit 50 for controlling the signals to be transmitted, and a receiver circuit 44 for demodulating the RF signal received by the antenna 42 to obtain the detected data.

The control circuit 50 is a microcomputer including CPU, ROM and RAM. A non-volatile memory EEPROM 50a is also included in the control circuit 20, and the vehicle ID and the detector IDs including tire positions, to which the detector IDs are respectively assigned, are memorized in the EEPROM 50a. The control circuit 50 feeds the initiation signal to the respective I/F circuits 46 together with the vehicle ID and the detector ID read out from the EEPROM 50a. The initiation signal is transmitted from the transmitter 30 to the detector 10 corresponding to that transmitter 30. The RF signal received by the antenna 42 and demodulated by the receiver circuit 44 is fed to the control circuit 50 which in turn outputs the detected data to the informing device 60.

Figure 3:
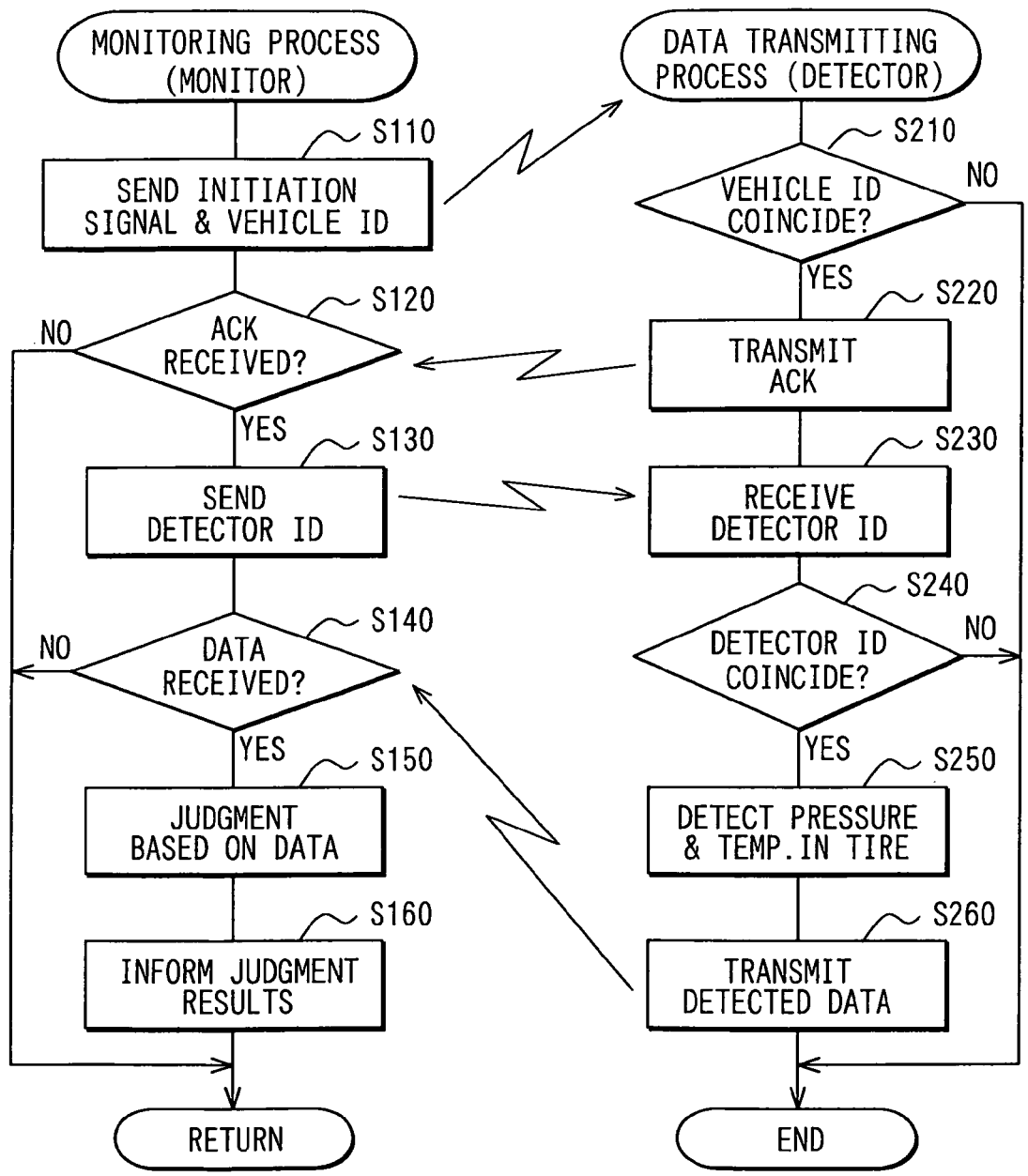
FIG. 3 is a flowchart showing a process of monitoring tire conditions and a process of transmitting data detected by a detector installed in a tire to a monitor.

A monitoring process performed in the monitor 40 and a transmitting process performed in the detector 10 will be described in detail with reference to FIG. 3. In the flowchart shown in FIG. 3, the process performed in one detector 10 is shown since the same process is performed in other detectors 10.

Upon starting the monitoring process, at step S110, the non-modulated LF signal is transmitted, for a predetermined time period, from the transmitter 30 to the detector 10 installed in the tire 4 positioned in the vicinity of that transmitter 30. The power source circuit 14 in the detector 10 generates a direct current voltage by rectifying the LF signal received by the antenna 12. Then, the LF signal including a binary code of the vehicle ID is transmitted to the detector 10. At step S210, upon generation of the power source voltage in the power source circuit 14, the control circuit 20 determines whether the vehicle ID transmitted from the transmitter 30 coincides with the vehicle ID stored in the EEPROM 20a. If the transmitted vehicle ID coincides with the stored vehicle ID, at S220, an acknowledging signal (ACK signal) is sent from the transmitter 28 to the monitor 40. If not coincides, the process comes to the end.

Figures 4A, 4B:
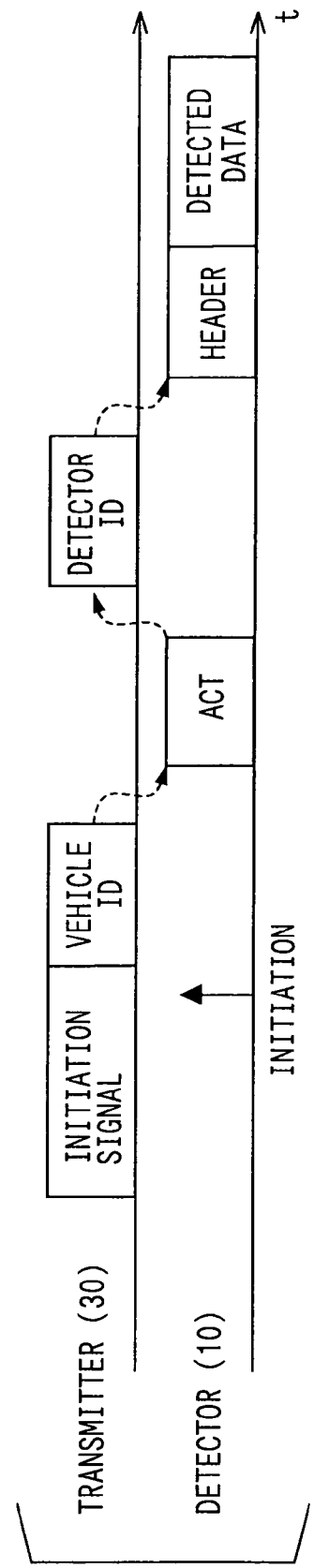
FIG. 4A is a table showing detector identification codes assigned to tires at respective positions.
FIG. 4B is a timing chart showing operation of a transmitter and a detector.

At step S120, whether the ACK signal is received or not in a predetermined time period is determined. If the ACK signal is received, the process proceeds to step S130, where the detector ID corresponding to the particular tire, conditions of which are to be detected, is transmitted to the detector 10 from the transmitter 30 positioned in the vicinity of that detector 10. The detector IDs assigned to the detectors installed in the tires 4 located at respective positions are pre-stored in the EEPROM 20a, as shown in FIG. 4A.

At step S230, the detector 10 receives the detector ID, and the process proceeds to step S240, where whether the received detector ID coincides with the detector ID stored in the EEPROM 20a is determined. If the detector ID coincides, the process proceeds to the next step S250, where a pressure and a temperature in the tire 4 are detected by the respective sensors 22, 24. Then, at step S260, the detected pressure and temperature (detected data) together with a header signal are wirelessly transmitted from the detector 10 to the monitor 40. If the detector ID does not coincides, the process comes to the end.

The monitor 40, at step S140, determines whether the detected data are received in a predetermined time period. If the detected data are received, the process proceeds to step S150, where whether tire conditions are normal or not is determined based on the received data. Then, at step S160, the detected tire conditions are outputted to the informing device 60. If it is determined that no detected data are received at step S140, the process comes to RETURN.

Since the operation of the detector 10 is initiated by the initiation signal followed by the vehicle ID and the detector ID as described above, the detector 10 is not erroneously operated by signals sent from other vehicles or by noises. As shown in FIG. 4B, receipt of the initiation signal followed by the vehicle ID is acknowledged by the ACK signal. Then, after the detector ID sent from the transmitter 30 coincides with the detector ID stored in the detector 10, the detected data are transmitted together with a header signal. Since the detector 10 is powered by the wirelessly sent LF signal, there is no need to install a battery in the detector. Since the monitor 40 powered by the on-board battery is operated only when the detection of the tire conditions is required, an amount of power consumed in the monitor 40 can be saved.

As described above, the detector IDs are assigned to respective detectors installed in tires 4 located at respective positions, and the relation between the detector IDs and the tire positions (the list shown in FIG. 4A) is memorized in the non-volatile memory EEPROM 50a. However, the tire positions may be changed in the vehicle by so-called tire-rotation. After the tire-rotation is done, the relation between the detector IDs and the tire positions (referred to as the detector ID assignment data) originally memorized in the EEPROM 50a becomes invalid. Therefore, it is necessary to renew the memory of the detector ID assignment data after the tire rotation is performed. In this embodiment, the memory renewal is done every time immediately after operation of the monitor 40 is started upon turning on an ignition switch of the engine.

The process for assigning the detector IDs to tire positions will be described with reference to FIG. 5. At step S310, one tire position, e.g., the front left position (FL) is selected. At step S320, the initiation signal and the vehicle ID are transmitted from the transmitter 30 (FL) corresponding to the FL position. At step S330, whether the ACK signal sent from the detector 10 to the monitor 40 is received or not is determined. If the ACK signal is received, the process proceeds to step S340. At step S340, the detector IDs not assigned to any tire position are picked up. Then, at step S350, one detector ID is selected from among the detector IDs not assigned, and the selected detector ID is transmitted from the transmitter 30 (FL) to the tire 4 (FL).

Then, at step S360, whether the detected data (the tire pressure and the tire temperature) are received by the monitor 40 is checked. If the detected data are received, the process proceeds to step S370, where the selected detector ID is memorized as a candidate of the detector ID to be assigned to the tire position, e.g., the tire position FL. Then, the process proceeds to step S380. If the detected data are not received at step S360, the process proceeds to step S380. This means that it is determined that there is the detector 10 having the detector ID which is assigned to the tire position (e.g., FL) if the detected data is returned from that detector 10.

At step S380, whether all of the detector IDs picked up at step S340 are transmitted in the same manner as done at step S350. If not, the process returns to S350 and the process sending the detector IDs is repeated until all the detector IDs are sent. If all of the detector IDs are sent, the process proceeds to step S390. At step S390, whether the detector ID memorized as the candidate at step S370 is only one or plural is determined. If only one detector ID is memorized as the candidate, the process proceeds to step S400, where that detector ID is assigned to that tire position, e.g., the FL position. In this case, the detector ID assigned to the tire position is memorized in the EEPROM 50a. If the candidates are plural, the process proceeds directly to step S420 because it is not possible in this case to assign the detector ID to that tire position.

At step S420, whether a series of steps from S320-S400 has been performed as to all the tire positions (FL, FR, RL and RR) is checked. If not, the process proceeds to step S430, where the next tire position to be checked is selected, and the process proceeds to step S320 to repeat the series of steps S320–400. If the detector ID is checked as to all the tire positions, the process proceeds to step S440. At step S440, whether any tire position to which the detector ID is not yet assigned exists is determined. If it is determined that the detector IDs are assigned to all of the tire positions, the process comes to the end. If there is any tire position to which no detector ID is assigned, the process proceeds to step S450, where a detector ID still remaining as a candidate in the memory is assigned to that tire position. Then, the process comes to the end.

In the manner described above, the detector ID assignment data are always renewed, and therefore, the detector IDs are assigned to correct tire positions even after the tire rotation is performed. The steps S420 and S440 in the process for assigning detector IDs to the tire positions shown in FIG. 5 are performed only when plural detectors 10 have responded to the LF signal including the detector ID transmitted from a single transmitter 30. However, this situation seldom occurs in the first embodiment described above, because each transmitter 30 communicates with only one detector 10 installed in a tire located in the vicinity of the transmitter 30. This situation may occur only when an output of one transmitter 30 is erroneously increased for some reasons. Accordingly, at the step of S450, the detector ID to be assigned to the tire position having no assigned detector ID can be easily found simply eliminating detector IDs already assigned among the candidates memorized in the EEPROM 50a.

In the case where the monitoring system includes a detector 10 installed in a spare tire and a transmitter 30 positioned in the vicinity of the spare tire, a detector ID has to be assigned also to the spare tire and memorized in the EEPROM 50a, as shown in FIG. 4A with a dotted line. In this case, there is a possibility that a signal from a transmitter 30 reaches plural detectors 10 and the plural detectors 10 respond to the transmitted signal in performing the steps S340–S380 shown in FIG. 5. The confusion caused by this situation can be avoided by pre-memorizing particular detectors 10 and a transmitter 30 that is able to reach those particular detectors 10 and by assigning the detector ID to each tire position based on both of the pre-memorized information and the actual response from the detector 10.

Figure 6:
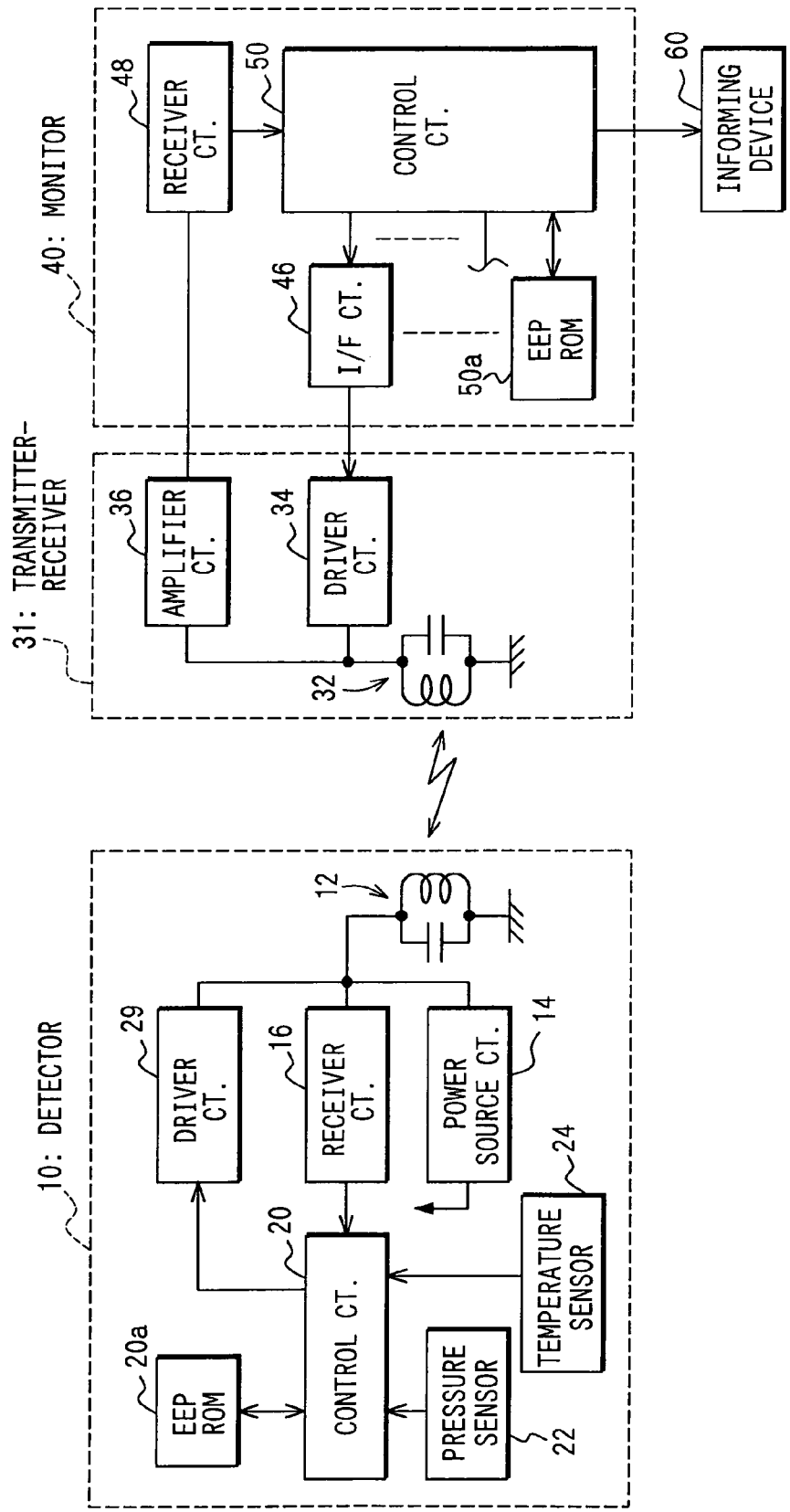
FIG. 6 is a block diagram showing a modified form of the tire condition detecting system shown in FIG. 2.

A modified form of the first embodiment will be described with reference to FIG. 6. In the first embodiment described above, the signal initiating operation of the detector 10 is sent by LF and the detected data is sent by RF. In this embodiment, both of the initiation signal and the detected data are sent by LF. More particularly, in the detector circuit 10, a driver circuit 29 for feeding the detected data to the antenna 12 is provided in place of the transmitter circuit 28 and the antenna 26 of the first embodiment. A transmitter-receiver 31 having an amplifier circuit 36 for amplifying the LF signal received by the antenna 32 is positioned, in place of the transmitter 30 of the first embodiment, in the vicinity of each detector 10. In the monitor 40, the RF receiving antenna 42 used in the first embodiment is eliminated, and the receiver circuit 44 of the first embodiment is replaced with a receiver circuit 48 that processes the signal received from the amplifier 36. In the modified form of the first embodiment, all communication between the detector 10 and the monitor 40 is carried out by LF signals transmitted and received by the transmitter-receiver 31.

The first embodiment may be modified, so that all communication is carried out by RF signals between the detector 10 and the monitor 40. In this case, the transmitter 30 positioned in the vicinity of each detector 10 is eliminated, and the antenna 42 is used as an antenna for transmitting and receiving the RF signals. In this case, however, a battery for supplying power to the detector 10 has to be installed in each detector 10 because the power cannot be supplied by the RF signal.

In the first embodiment, it is possible to eliminate the detector ID and the assignment of the detector ID to each tire position by making each transmitter 30 communicate with only one corresponding detector 10. In this case, however, it is necessary to exactly set a direction of the transmitting antenna 32 in the transmitter 30 and to properly choose power and frequency of the LF signals transmitted from the transmitter 30.

Figure 7:
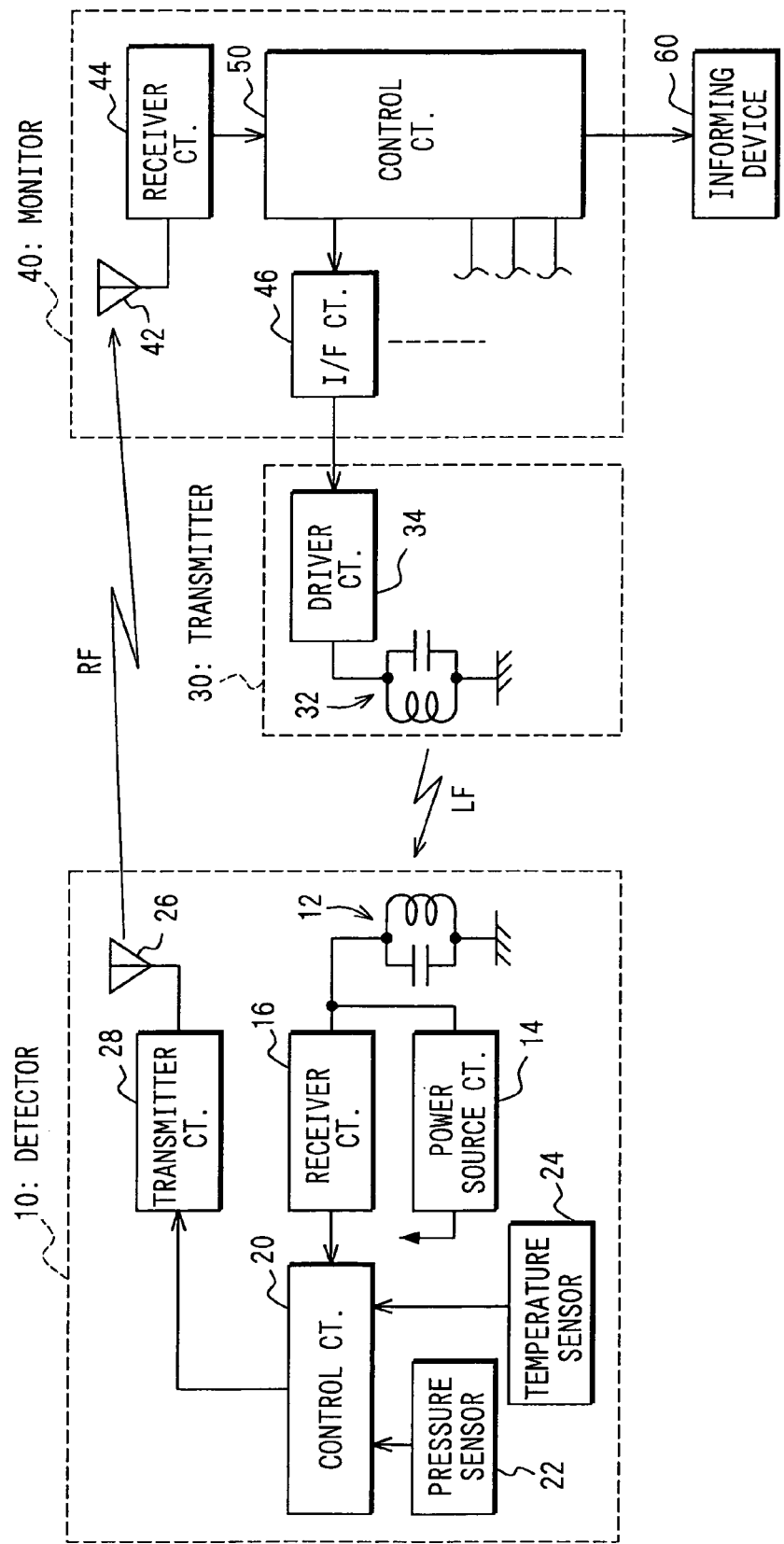
FIG. 7 is a block diagram showing a structure of a tire condition monitoring system as a second embodiment of the present invention.

A second embodiment of the present invention will be described with reference to FIGS. 7–11. In this second embodiment, the vehicle ID used in the first embodiment is not used. The structure of the monitoring system as the second embodiment is shown in FIG. 7. Compared with FIG. 2 showing the first embodiment, the EEPROM 20a in the detector 10 and the EEPROM 50a in the monitor 40 are eliminated in the second embodiment as shown in FIG. 7. The detector IDs and data showing detector ID assignment to tire positions are stored in the control circuit 50 in the monitor, and the detector ID is stored in the control circuit 20 in the detector 10. Other structures are the same as those of the first embodiment.

Figure 8:
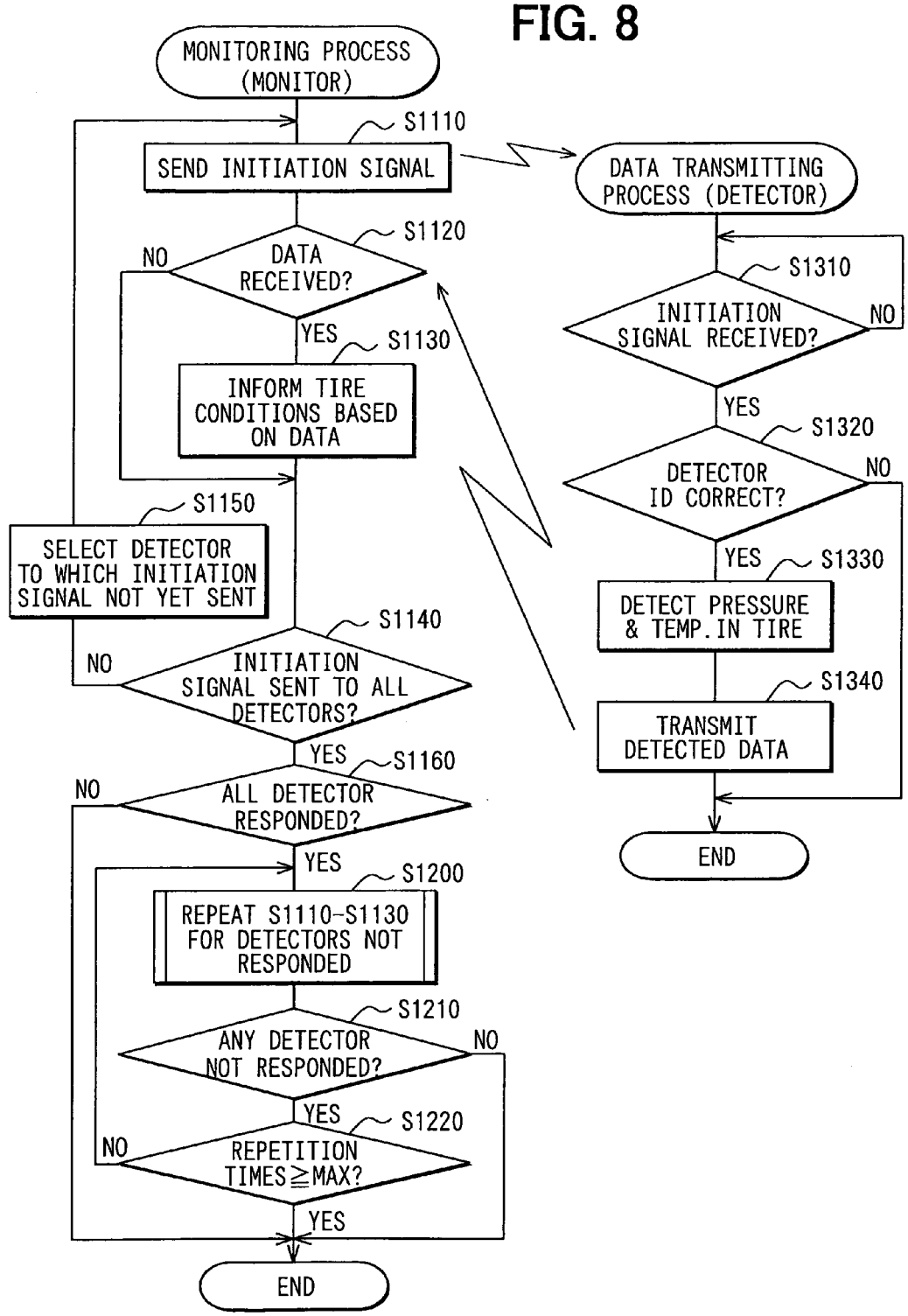
FIG. 8 is a flowchart showing a process of monitoring tire conditions and a process of transmitting data from a detector, performed in the second embodiment.

With reference to FIG. 8, a process of monitoring the tire conditions performed in the monitor 40 and a process of transmitting detected data from the detector 10 will be described in detail. The monitoring process is performed after a door lock of a vehicle is unlocked or the engine is started. The data transmitting process is performed when operation of the detector 10 is initiated by the initiation signal transmitted from the monitor 40 via the transmitter 30.

Upon starting the monitoring process, at step S1110, the initiation signal is sent from the transmitter 30 to the detector 10 installed in a tire positioned close to that transmitter 30.

The initiation signal is an LF signal not modulated. The initiation signal is sent for a predetermined time period and followed by the detector ID signal. At first, the tire 4 (FL) is targeted, and then the tires 4 (FR), 4 (RL) and 4 (RR) are sequentially selected at step S1150 (explained later).

Upon sending the initiation signal to the detector 10, power for operating the detector 10 is generated in the power source circuit 14, and the data transmitting process in the detector 10 is initiated. At step S1310, whether the initiation signal including the detector ID is received or not is checked. If received, the process proceeds to step S1320, where whether the detector ID received coincides with the detector ID stored in the detector 10 is determined. If the detector ID received coincides with the detector ID stored, the process proceeds to step S1330, where the tire pressure and the tire temperature are detected using the pressure sensor 22 and the temperature sensor 24, respectively. Then, at step S1340, the detected data (the tire pressure and the tire temperature) are transmitted together with a header signal from the detector 10 to the monitor 40 using the RF signal. Then, the process comes to the end. On the other hand, it is determined that the detector ID received does not coincides with the detector ID stored at step S1320, the process directly comes to the end.

In the monitoring process, at step S1120, whether the detected data transmitted from the detector 10 are received by the monitor 40 in a predetermined time period is determined. If received, the process proceeds to step S1130, where the RF signal received by the monitor 40 is demodulated to obtain the detected data (pressure and temperature in the tire), and the data are fed to the informing device 60 to inform the driver of the detected tire conditions. If it is determined, at step S1120, that the detected data are not received, the process directly proceeds to step S1140.

At step S1140, whether the initiation signal is sent to all the detectors 10 or not is determined. If there are still left detectors 10 to which the initiation signal has not been sent, the process returns to step S1110 via step S1150. At step S1150, the targeted detector 10 is picked up from among the detectors 10 that have not yet received the initiation signal. Then, a series of steps from S1110 to S1130 is repeated until the initiation signal is sent to all the detectors 10.

At step S1140, whether there is any detector 10 that has not responded to the initiation signal including the detector ID is determined. If there is no such non-responding detector 10, the process comes to the end. If there is any detector 10 that has not responded, the process proceeds to step S1200. At step S1200, a series of steps from S1110 to S1130 is repeated for the non-responding detector 10. At the next step S1210, whether there is any detector 10 that does not respond is checked again. If all the detectors 10 have responded, the process comes to the end. If there is still any detector 10 that has not responded, the process proceeds to step S1220, where whether the number of repetitions of step S200 exceeds a predetermined maximum number MAX is checked. If the repetition times exceed the predetermined maximum times, the process comes to the end. If not, the process returns to step S200 to repeat the series of steps S1110 to S1130.

In the process described above, the initiation signal (LF signal) is transmitted sequentially to each detector 10, and the detected data (RF signal) returned from each detector 10 are received by a common antenna 42 in the monitor 40. Therefore, the operation of the detectors 10 can be initiated only when the tire condition data are required. Accordingly, power consumption in the detectors 10 can be minimized. Since the power for operating the detector 10 is wirelessly supplied by the LF signal, it is not necessary to install a battery in the detector 10. Therefore, the detector 10 can be made compact and at a low cost. Further, there is no such possibility that the detector 10 cannot operate because of shortage in a battery capacity.

The initiation signal sent to each detector 10 is followed by the detector ID that is assigned to that detector, and the tire condition data are transmitted from that detector 10 only when the detector ID received coincides with the detector ID stored in that detector. Therefore, there is no such a chance that the detected data are simultaneously transmitted from plural detectors 10, thereby causing confusion in the signals received by the monitor 40.

When there is any detector 10 that is unable to send the detected data to the monitor 40 because of interfering noises or the like even though the initiation signal has been given to the detector 10, the initiation signal is repeatedly given (within the predetermined maximum times) to the non-responding detector 10 until the detected data are obtained by the monitor 40, as described above. Therefore, such possibility that no tire condition data are available is minimized.

Figure 9:
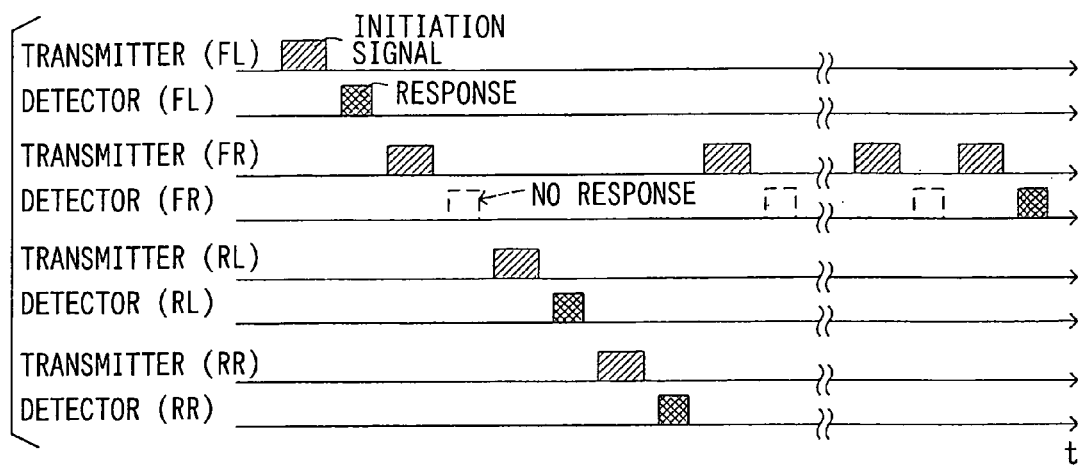
FIG. 9 is a timing chart showing operation of transmitters and detectors, wherein an initiation signal is transmitted again to a non-responding detector after a first initiation signal is transmitted to all detectors.
Figure 10:
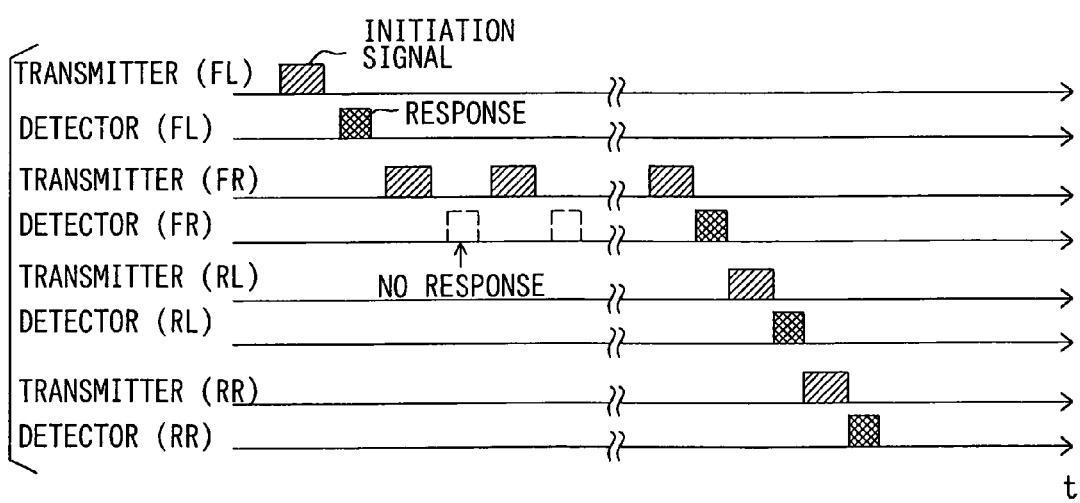
FIG. 10 is a timing chart showing operation of transmitters and the detectors, wherein an initiation signal is transmitted again to a non-responding detector immediately after no response is found.

In the monitoring process described with reference to FIG. 8, the initiation signal associated with the detector ID is sequentially sent to the detectors, as shown in FIG. 9. The process of repeatedly sending the initiation signal to the non-responding detector 10 (the detector 10 in the front right tire (FR) is exemplified as the non-responding detector in FIG. 9) is performed after the initiation signal is sent to all of the detectors. However, the timing of the repeating process may be modified as shown in FIG. 10. In FIG. 10, the process of repeatedly sending the initiation signal to the non-responding detector (detector 10 (FR) in this example) is carried out right after such non-response is found.

Figure 11:
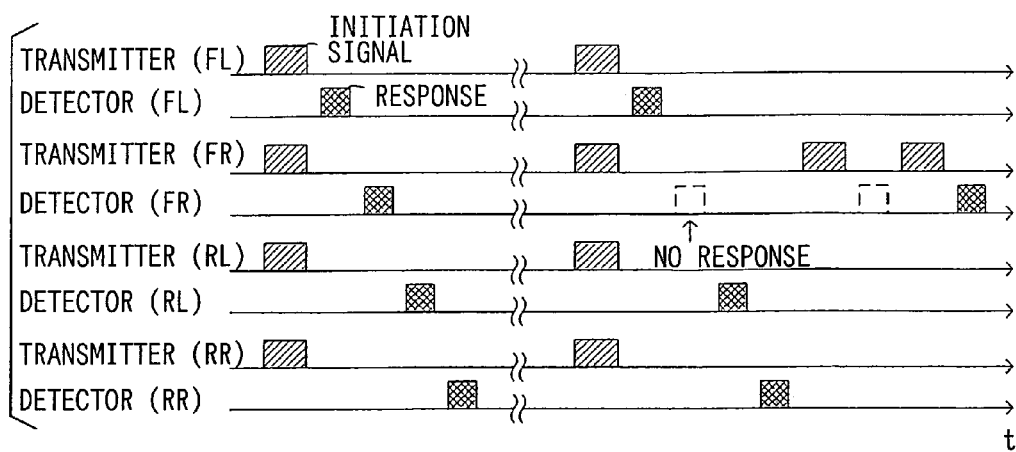
FIG. 11 is a timing chart showing operation of transmitters and detectors, wherein an initiation signal is simultaneously transmitted to all detectors.

The initiation signal may be sent simultaneously to all of the detectors 10 as shown in FIG. 11. In this case, however, the response signals have to be sequentially transmitted, as shown in FIG. 11, to avoid data confusion at the receiving end, i.e., in the monitor 40. This can be realized by setting respectively different delay times (time period between receipt of the initiation signal and sending of the response) in the detectors 10. The repeating process may be carried out, in this case, after the last detector 10 (the detector 10 (RR) in this example) has responded.

Figure 12:
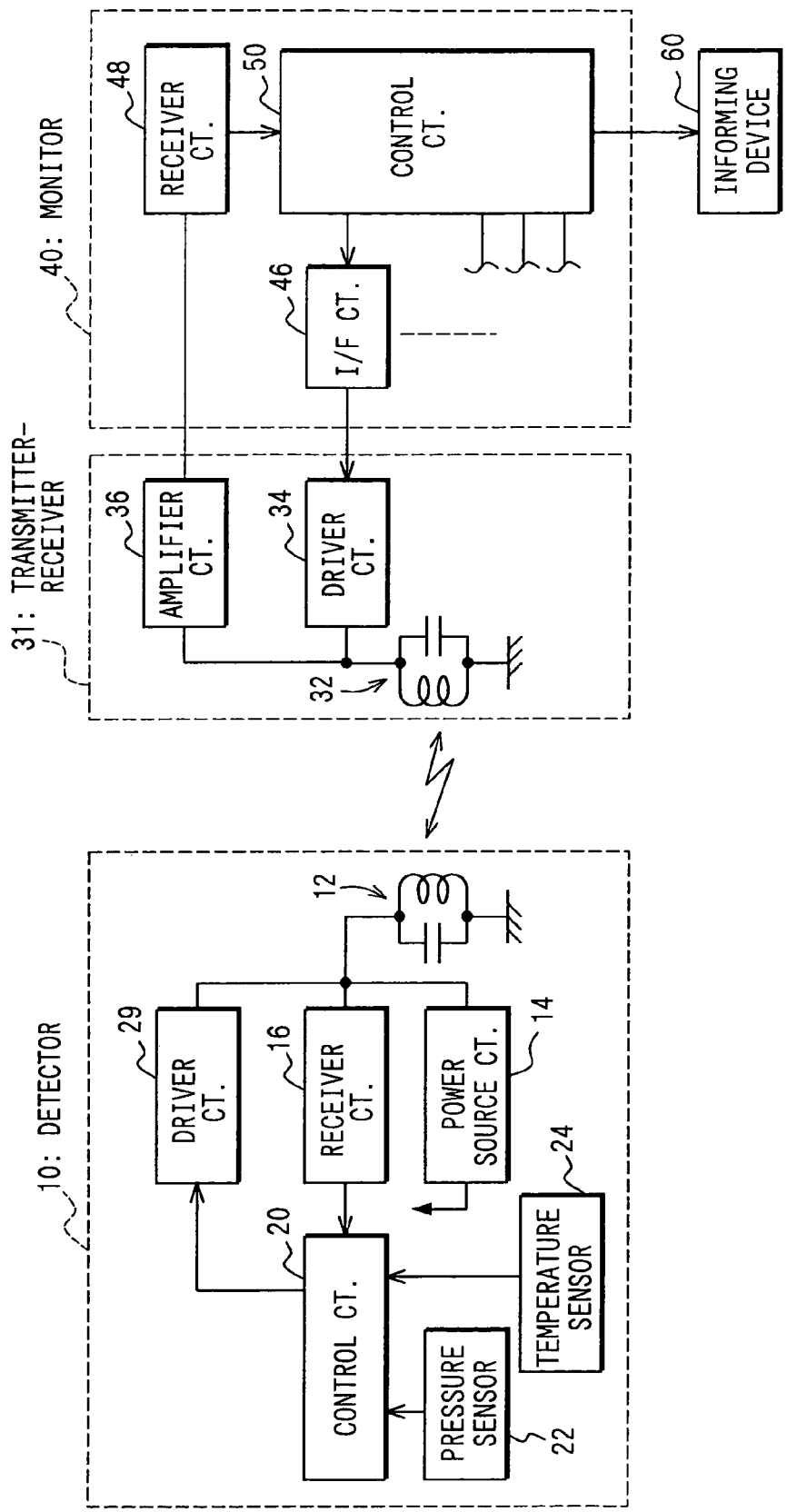
FIG. 12 is a block diagram showing a modified form of the tire condition monitoring system shown in FIG. 7.

A modified form of the second embodiment will be described with reference to FIGS. 12 and 13. In the second embodiment described above, the initiation signal is sent by the LF signal to the detector 10 while the detected data are sent to the monitor 40 by the RF signal. In this modified form, however, both of the initiation signal and the detected data are sent by the LF. As shown in FIG. 12, the RF antennas 26, 42 used in the second embodiment shown in FIG. 7 are eliminated. The transmitter circuit 28 of the detector 10 shown in FIG. 7 is replaced with a driver circuit 29. The transmitter 30 in FIG. 7 is replaced with a transmitter-receiver 31 having an amplifier circuit 36, and the receiver circuit 44 in FIG. 7 is replaced with a receiver circuit 48 that obtains the detected data from signals fed from the amplifier circuit 36. Other structures are the same as those of the second embodiment.

The transmitter-receiver 31 is placed in the vicinity of each detector 10 installed in the tire taking a respective position. The initiation signal followed by the detector ID is transmitted from the transmitter-receiver 31 to the detector 10, and the detected data are transmitted from the detector 10 to the transmitter-receiver 31. In other words, two-way communication is performed between the antenna 12 of the detector 10 and the antenna 32 of the transmitter-receiver 31 using the LF waves.

Figure 13:
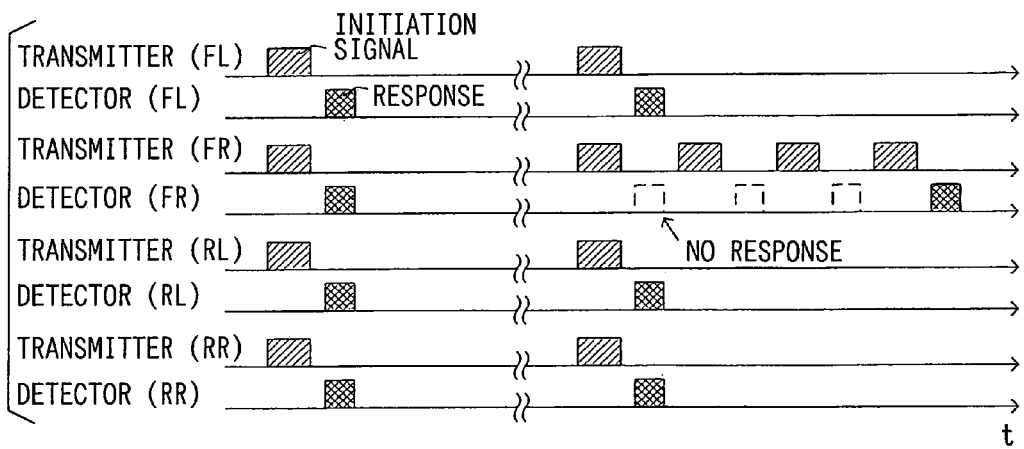
FIG. 13 is a timing chart showing operation of transmitters and detectors, performed in the modified form of the second embodiment.

Since the detected data are sent through the transmitter-receiver 31 that corresponds to only one detector 10, the detected data can be transmitted simultaneously from all of the detectors 10 without causing interference or confusion, as shown in FIG. 13. It is also possible, in this modified form, to send initiation signal and to receive the response in the timing shown in any one of FIGS. 9–11.

In the second embodiment and its modified form, it is possible to eliminate the detector ID and the assignment of the detector ID to each tire position by making each transmitter 30 (or the transmitter-receiver 31) communicate with only one corresponding detector 10. In this case, however, it is necessary to exactly set a direction of the transmitting antenna 32 in the transmitter 30 and to properly choose power and frequency of the LF signals transmitted from the transmitter 30 (or the transmitter-receiver 31).

While the present invention has been shown and described with reference to the foregoing preferred embodiments, it will be apparent to those skilled in the art that changes in form and detail may be made therein without departing from the scope of the invention as defined in the appended claims.

What is claimed is:

1. A system for monitoring tire conditions including pressure in a tire of a vehicle, the system comprising:
    a detector configured to facilitate detecting tire conditions including pressure in the tire, the detector being installed in each tire of the vehicle, the detector wirelessly further being configured to facilitate transmitting detected data concerning the tire conditions, the detector having memorized therein a vehicle identification code;
    a transmitter configured to facilitate wirelessly transmitting an initiation signal for initiating detection of the tire conditions to the detector, the transmitter being installed in the vicinity of each tire; and
    a monitor configured to facilitate sending the initiation signal to the transmitter and receiving the detected data from the detector, the initial signal including the vehicle identification code identifying this vehicle on which the monitoring system is installed, the monitor informing a driver of the vehicle of detected tire conditions,
    wherein the detected data are transmitted only when the vehicle identification code included in the initiation signal coincides with the vehicle identification code memorized in the detector.

2. The monitoring system as in claim 1, wherein:
the initiation signal further includes a detector identification code identifying the detector installed in each tire taking respective positions; and
the detected data are transmitted from the detector only when both the vehicle identification code and the detector identification code included in the initiation signal coincide with the vehicle identification code and the detector identification code memorized in the detector.

3. The monitoring system as in claim 2, wherein:
the monitoring system further includes means for finding the detector identification code memorized in each detector installed in each tire taking respective positions by sequentially transmitting detector identification codes to the detector and by determining that the detector identification code memorized in the detector is the same as the detector identification code transmitted to the detector if the detected data concerning the tire conditions are transmitted from the detector.

4. The monitoring system as in claim 1, wherein:
the detector starts detection of the tire conditions upon receipt of the initiation signal; and
the detection of the tire conditions is terminated after the detected data concerning the tire conditions are transmitted to the monitor.

5. The monitoring system as in claim 4, wherein:
the initiation signal transmitted from the transmitter to the detector is a low frequency signal in a long wave band;
the detector includes a power source circuit that rectifies the initiation signal to generate a power source voltage for operating the detector; and
the detector starts its operation upon generation of the power source voltage.

6. The monitoring system as in claim 4, wherein:
the monitor includes a single receiver that receives the detected data from all of the detectors.

7. The monitoring system as in claim 6, wherein:
the detector transmits the detected data using radio frequency signals in either a very high frequency band or a ultra high frequency band.

8. The monitoring system as in claim 4, wherein:
the transmitter includes means for receiving the detected data transmitted from the detector and for sending the detected data to the monitor.

9. The monitoring system as in claim 8, wherein:
the detector and the transmitter include respective antennas that transmit and receive low frequency signals in a long wave band;
the initiation signal is transmitted from the transmitter to the detector and the detected data are transmitted from the detector to the transmitter, both using the low frequency signals; and
the detector includes a power source circuit that rectifies the initiation signal to formulate a power source voltage, and the detector starts its operation upon formulation of the power source voltage.

10. The monitoring system as in claim 4, wherein:
the initiation signal is sequentially sent to detectors to initiate operation thereof one by one, and the detected data are sequentially transmitted from the detectors to the monitor to avoid data confusion in the monitor.

11. The monitoring system as in claim 10, wherein:
the initiation signal is sent again to the detector which has been unable to transmit the detected data.

12. The monitoring system as in claim 4, wherein:
the initiation signal is simultaneously sent to all the detectors, and the detectors are adapted to transmit detected data at respectively different timing to avoid data confusion in the monitor.

13. The monitoring system as in claim 8, wherein:
the initiation signal is simultaneously transmitted from the transmitters to the corresponding detectors, and the detected data are simultaneously transmitted from the detectors to the corresponding transmitters.

14. The monitoring system as in claim 12, wherein:
the initiation signal is transmitted again to the detector which has been unable to transmit the detected data.

15. The monitoring system as in claim 4, wherein:
the initiation signal includes a detector identification code identifying the detector installed in each tire taking respective positions; and
the detected data are transmitted from the detector when the detector identification code included in the initiation signal coincides with the detector identification code memorized in the detector.

* * * * *